Patented May 31, 1932

1,860,781

UNITED STATES PATENT OFFICE

OTTO LIEBKNECHT, OF BERLIN-GRUNEWALD, GERMANY, ASSIGNOR TO THE PERMUTIT COMPANY, OF NEW YORK, N. Y., A CORPORATION OF DELAWARE

REMOVING SILICA FROM WATER

No Drawing. Application filed June 1, 1928, Serial No. 282,278, and in Germany June 4, 1927.

This invention relates to removing silica from water; and it comprises a method of removing dissolved and dispersed silica from water wherein such water is contacted with metal oxid gels substantially free of silica; the removal of silica being ordinarily, but not always, preceded by a softening treatment with alkaline reagents (soda-lime) or with zeolites; all as more fully hereinafter set forth and as claimed.

Silica in some dissolved or dispersed form is a frequent but not invariable component of the dissolved solids of natural waters. Some raw waters may carry 20 or more milligrams of silica per liter. Ordinary alkaline softening methods, such as the soda-lime process, do not usually remove all the silica and do not even necessarily lessen its amount. Zeolite softeners may or may not diminish the amount.

Depending upon the composition of the water, the silica present may be desirable, or undesirable. In some boiler waters its presence leads to a formation of intractable types of scale. The present invention provides a method of removing silica when its presence is deemed undesirable.

In the boiler, with a softened, somewhat alkaline feed water silica does not generally go out of solution and contribute to the formation of scale until its concentration exceeds about 500 milligrams per liter. With any lime or magnesia in the feed water the permissible concentration is less. Probably it is very much less. Exact data are however not available. Whatever the limits may be, whenever boiler conditions permit accumulation of dissolved silica it may be advisable to remove or lessen the amount of silica in inflowing water.

I have found that silica may be removed from waters by percolating the water through a pervious bed of granular hydrated metal oxides of various kinds. Dried gels in granular form are best. The gel should be free, or substantially free, of silica. After a period of use in removing silica, the bed becomes charged with silica to an extent sufficient to reduce its activity. It may then be regenerated by treatment with a weak alkali or other solution adapted to abstract the silica and render the granules ready for reuse.

I have used a wide variety of granular dried gels of metallic oxides; basic, acid and amphoteric. Practically any oxid can be used which is insoluble in water, resistant to weak alkali solution and is capable of forming a silicate or polysilicate. For practical reasons, iron oxid gels and alumina gels, are generally used. Both are sufficiently reactive for the present purposes and other and more expensive oxids do not have sufficient additional activity to justify their cost except as small additions to iron or aluminum oxid gels. It is however sometimes worth while to heighten the activity of iron oxid and alumina gels by co-precipitating a little zinc oxid or cadmium oxid or another one of the hereinafter recited oxids.

In a practical embodiment of the present invention forming an iron oxid gel suitable for use in removing silica, a solution of ferric chlorid may be treated with a strong solution of caustic soda, caustic potash or ammonia. The concentrations are usually so chosen as to form a precipitate as a jelly rather than a precipitate separating from the mother liquor; the jelly occupying the full volume or less than the full volume of the reagents. The jelly may be dried at 80 to 90° C. and washed. There may be two drying operations with an intermediate washing. Washing is continued until the alkalinity substantially disappears. At this time, however, there is still retained alkali in the gel. In washing and drying the procedures indicated by Rudorf U. S. Patent No. 1,304,206 or Massatsch U. S. Patent No. 1,343,927 may be followed. Where either potash or ammonia is used as a precipitant, the retained alkalinity of the gel is primarily due to these bases.

The dried gel is granulated and used in a pervious bed for purifying water. With the particular gel whose manufacture was just described, it is found that a raw water containing 17 milligrams of silica per liter can have its silica reduced to 1 milligram in passing 100 parts by volume of water through 50 parts by volume of gel in four minutes. This degree of activity persists for a suitable time and is but slowly lost. After passing 80,000 parts by volume of the 17 mg. water through the bed, the effluent water contains but 7.5 to 9 milligrams of silica per liter. By a slower passage of water, at this time the maximum silica is about 5 mg. On regeneration with a weak solution of caustic soda, the original activity is restored.

A similar gel can be made by substituting aluminum chlorid solution for the ferric chlorid solution, the procedures being otherwise the same. Mixtures of ferric chlorid and aluminum chlorid solutions give mixed gels.

In regeneration an 0.25 per cent caustic soda solution is suitable.

The activity of both of the gels just described is somewhat enhanced by co-precipitating various other oxides. For example titanium chlorid may be dissolved in the aluminum chlorid solution or the iron chlorid solution; the procedure otherwise being the same. An acid solution of tin oxid, of titanic oxid or of thorium oxid may be used in the same way. It is not economical to use large proportions of these other oxids and it is not necessary to adopt stoichiometric proportions. A gel containing ferric oxid and stannic oxid in the ratio 9:1 is an efficient agent for removing silica.

Indifferent body giving materials, such as coke, activated carbon, rock fragments, etc., advantageously of a porous nature, may be used in the gels. For example granulated pumice stone may be mixed in one or other of the two reacting solutions prior to mixture.

Alone, the oxides of magnesium, zinc, cadmium, copper and manganese do not readily give gels; but small proportions of these oxids in a gel of aluminum oxid or iron are quite advantageous.

In treating softened boiler waters, where conditions are such that the input of silica to the boiler is greater than the output with the blow off water and siliceous scales tend to form, it is advantageous to put a pervious bed of hydrated oxids capable of taking up silica between the boiler inlet and the softener whether the softener be a soda lime apparatus or a zeolite softener.

Where substances are used in the gel which are particularly sensitive to caustic alkali solutions it is possible to regenerate with carbonated alkali, such as a soda ash solution.

The gelled oxids which I have so far found efficient for removing silica from water are iron oxid, chromium oxid, aluminum oxid, cerium oxid, scandium oxid, magnesium oxid, zinc oxid, cadmium oxid, copper oxid, $TiO_2$, $SnO_2$, $ZrO_2$, thorium oxid, and tungstic acid. The various gels in addition to their property of removing silica from water have some efficiency as softening agents; that is they remove lime and magnesia. Sometimes this softening effect is deliberately sought; as, for example, where the gels are employed in treating soft or softened water which is not of zero hardness. In the event that the gels abstract lime or magnesia from water in addition to silica these bodies may be removed by regeneration with common salt solution. It is sometimes advisable in the practical use of these gels to give two regenerations, one with the common salt solution to remove lime or magnesia and another one with weak alkali solution to remove silica. Either regeneration may precede the other. Usually, regenerations with salt solution are not required as often as regenerations with alkali, due to the low quantity of lime or magnesia removed.

What I claim is:—

1. In the removal of silica from water containing the same the process which comprises percolating said water through a pervious bed of non-siliceous hardened gel iron oxid.

2. In the removal of silica from water containing the same the process which comprises alternately passing water to be desilicified through a pervious bed of granular hardened gel oxids and reviving said bed by the passage of a weak alkaline solution therethrough.

3. The process of treating water containing scale forming constituents which comprises passing such water through a pervious bed of granular hardened non-siliceous gel oxids and regenerating the bed by passing a solution of salt therethrough.

4. The process of treating water containing scale forming constituents which comprises passing such water through a pervious bed of granular hardened gel oxids and regenerating the bed by passing solutions of alkali and of salt therethrough.

5. In the purification of water for use in steam boilers or for other like purposes, a process which comprises reducing the silica content of the water by passing it through a pervious bed of a hardened granular non-siliceous metallic oxid gel, thereby removing from the water dissolved and colloidally dispersed silica.

6. In the purification of water for use in steam boilers or for other like purposes, a process which comprises subjecting the water to a softening treatment and then reducing the silica content of the softened water by passing it through a pervious bed of a hardened granular non-siliceous metallic oxid gel, thereby removing from the water dissolved and colloidally dispersed silica remaining in the water after the softening treatment.

In testimony whereof I affix my signature.

OTTO LIEBKNECHT.